July 29, 1969

R. G. LANDRY 3,458,061

DELIVERY BIN STORAGE SYSTEM

Filed Oct. 23, 1967

INVENTOR
ROBERT G. LANDRY

BY Semmes & Semmes

ATTORNEYS

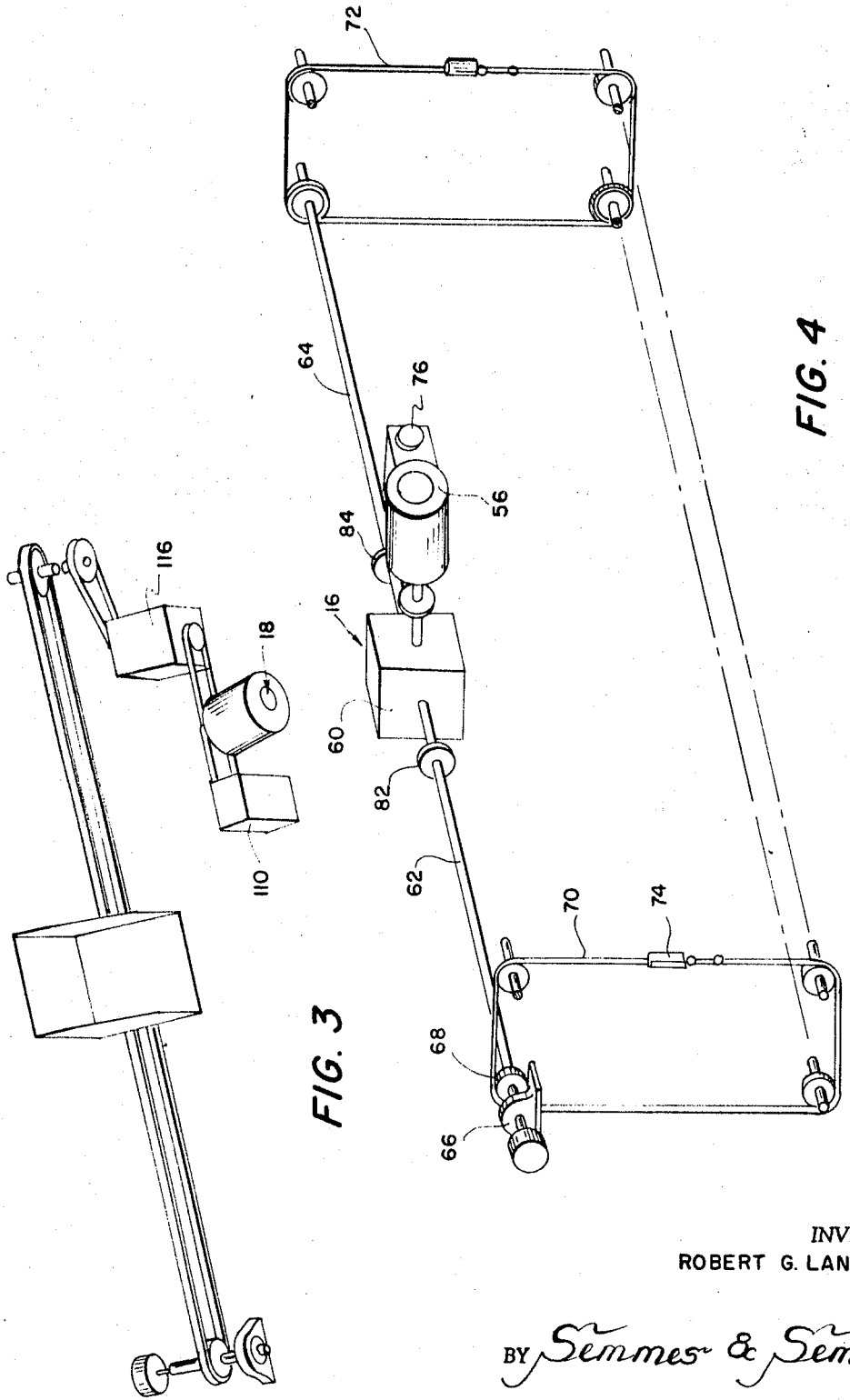

July 29, 1969
R. G. LANDRY
3,458,061
DELIVERY BIN STORAGE SYSTEM
Filed Oct. 23, 1967
7 Sheets-Sheet 4
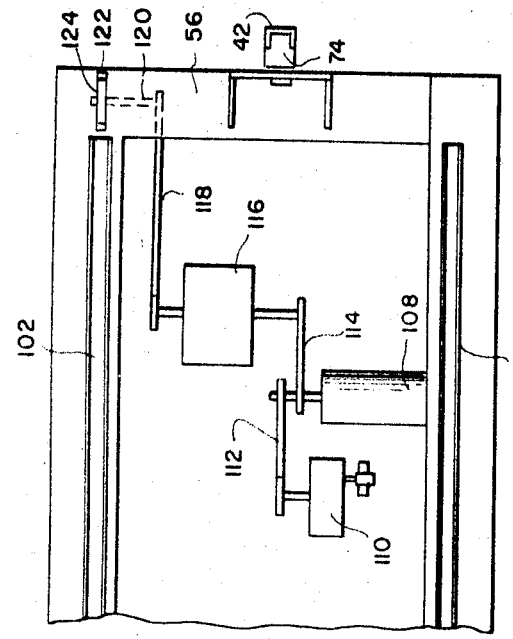
FIG. 5
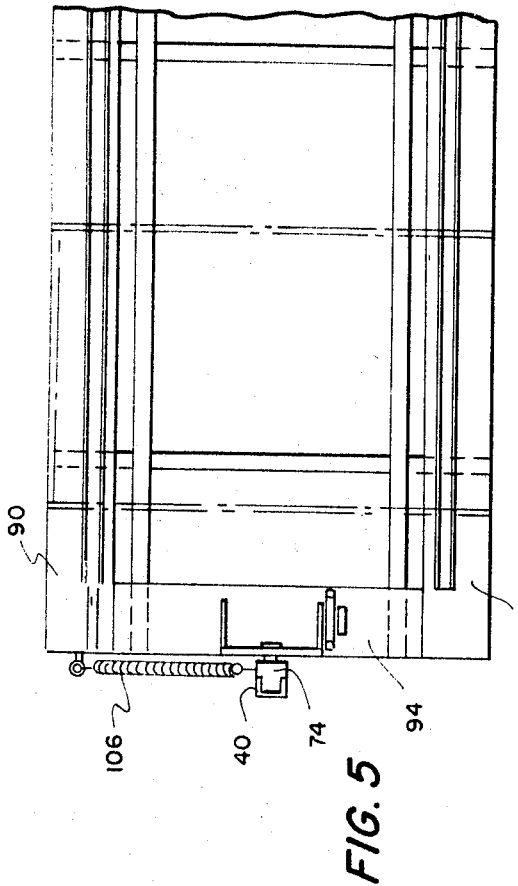
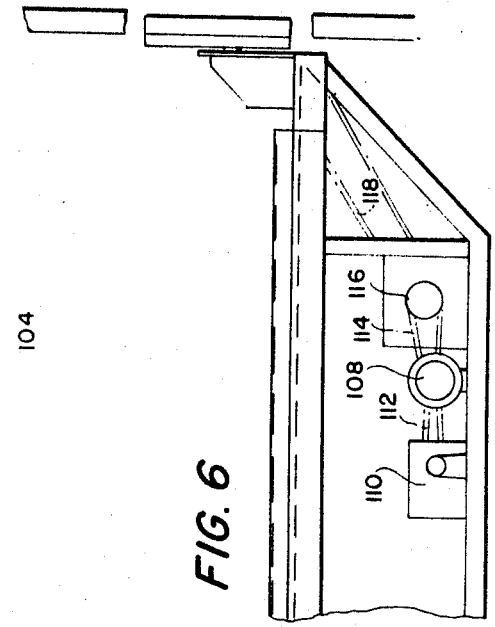
FIG. 6
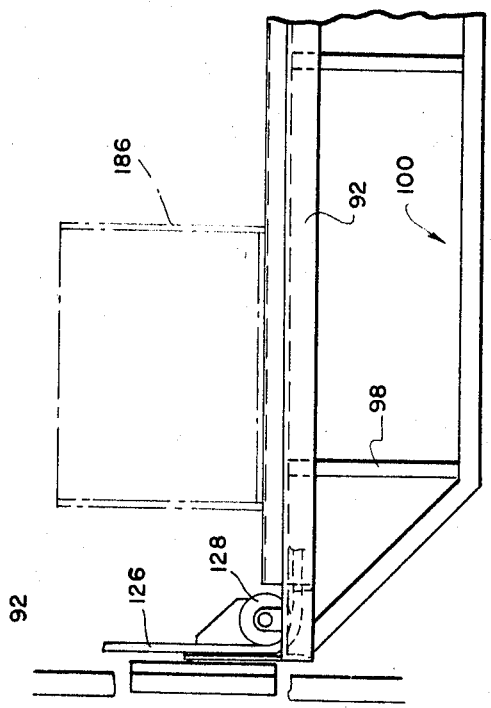
INVENTOR
ROBERT G. LANDRY
BY Semmes & Semmes
ATTORNEYS

INVENTOR
ROBERT G. LANDRY

BY Semmes & Semmes
ATTORNEYS

July 29, 1969

R. G. LANDRY 3,458,061

DELIVERY BIN STORAGE SYSTEM

Filed Oct. 23, 1967

INVENTOR
ROBERT G. LANDRY

BY Semmes & Semmes

ATTORNEYS

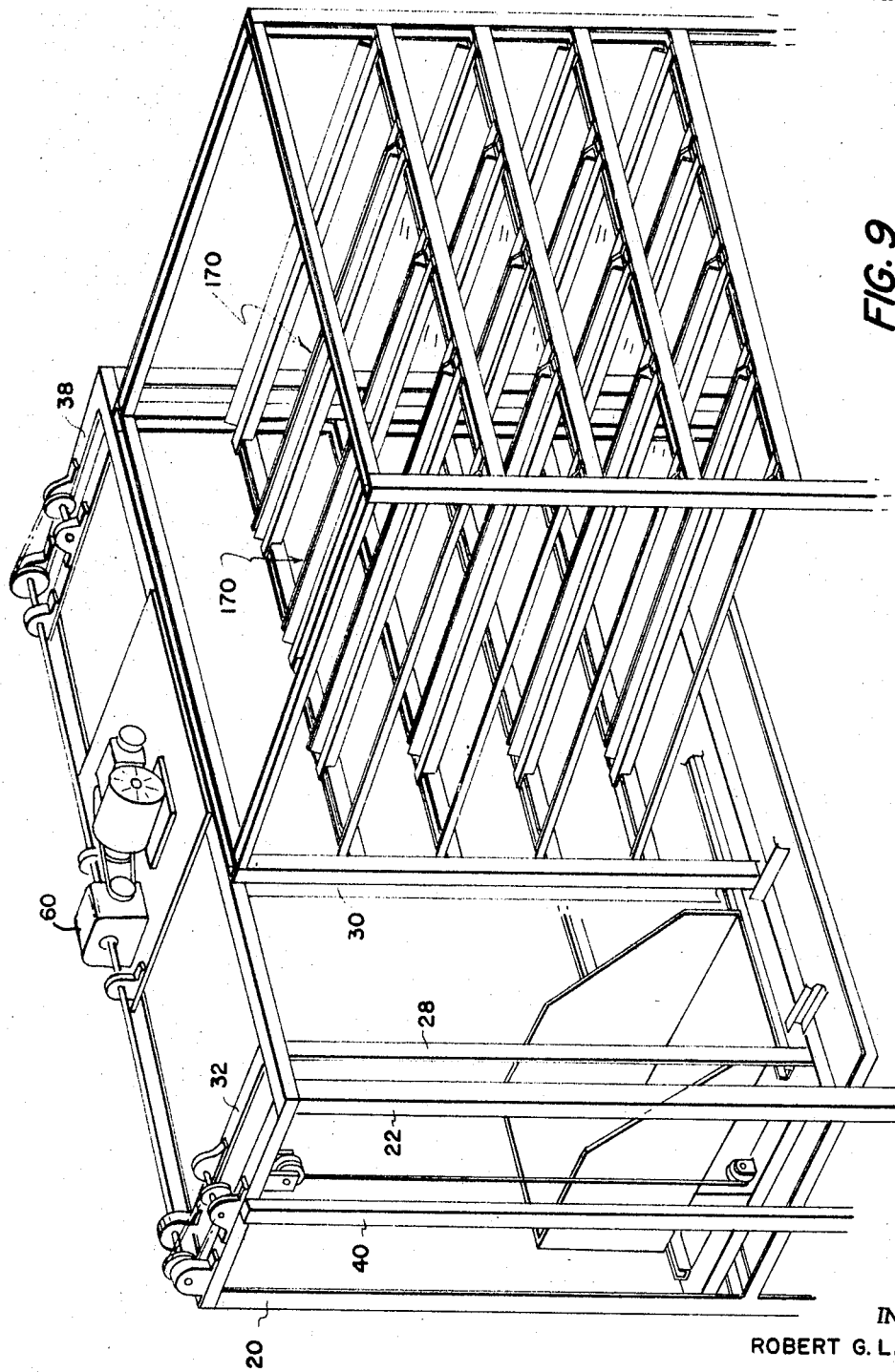

United States Patent Office 3,458,061
Patented July 29, 1969

3,458,061
DELIVERY BIN STORAGE SYSTEM
Robert G. Landry, Lewiston, Maine, assignor to Diamond Machinery Company, Lewiston, Maine, a corporation of Maine
Filed Oct. 23, 1967, Ser. No. 679,597
Int. Cl. B65g 1/06, 63/02
U.S. Cl. 214—16.4                                6 Claims

ABSTRACT OF THE DISCLOSURE

A delivery bin system adapted for supporting a delivery bin for movement of material to be stored in a superposed vertical and horizontal planes adjacent a material storage area of the type having a plurality of shelves, each shelf having a plurality of individual storage chutes.

BACKGROUND OF THE INVENTION

Field of the invention

In shoe manufacturing, warehouse storage and similar operations, there exists a great need for an automatic delivery system for delivering material to a conventional rack storage area, defined by superposed shelves, each shelf having a number of individual storage chutes. In shoe manufacturing, shoe components may be delivered to the storage area, then removed from the storage area into the stitching, fitting and lasting room. A variety of earlier inventors have devised chain driven elevators for use together with a storage rack comprised of a number of inclined chutes embodying idler rollers. In the brick manufacturing art, much of the development has included means for delivering of manufactured bricks to a storage rack in a kiln and removal from the kiln after firing. Various drive rollers, delivery mechanisms and palletizing mediums have been employed. However, the prior art does not contemplate an elevator delivery bin system of the type supporting a delivery bin for movement in superposed vertical and transverse planes adjacent the central storage area wherein the degree of vertical and transverse drive is determined by counting motor shaft revolutions of the driving mechanism. And, the prior art has not suggested a delivery bin having a drive roller floor which assists in loading and unloading.

The present invention is directed to automatic positioning of the delivery bin adjacent the desired storage chute in the desired shelf and includes drive means in the delivery bin itself actuable upon delivery of the pallet into the bin floor and actuable upon arrival of the bin at the desired storage chute so as to assist the delivery bin in its reception of the pallet and ejection into the desired chute.

Description of the prior art

Moore 1,288,116 in FIGS. 1 and 8 shows a chain driven elevator combined with implanted roller bed. The Moore driving sprockets in the delivery system are mounted in an arcuate holder and the individual bricks are removable to a bucket conveyor by hinged drop door 11. Moore in FIG. 8 shows a modification of the invention wherein the roller bed curing racks are mounted centrally of the front and back elevators. Inventor Hicks 2,634,869 employs a roller track to move his elevator platform between a brick-making conveyor and the pipe racks. Rathwell 1,561,664 employs the elevator concept in racking of baked bread. Francis 3,263,831 addresses himself to palletized storing, discussing the necessity for such storage where property values and space considerations dictate.

None of the prior art devices suggest applicant's technique of driving the delivery bin through transposed vertical and horizontal planes by means of counting revolutions of driving mechanism and assisting delivery and ejection by drive rollers mounted within the bin.

SUMMARY OF THE INVENTION

According to the present invention there is provided a delivery bin elevator of the type supporting a delivery bin for movement in superposed vertical and transverse planes. A frame defines these planes. A platform supporting the delivery bin is drivable through the vertical plane by means of a drive system supported on the frame. The delivery bin is driven transversely of the platform by an independent drive means. The delivery bin itself has in its bed a plurality of driving rollers, driven in one direction to advance material or pallet into the bin, as it is received and upon arrival at the desired storage area, driven in another direction to advance the material or pallet out of the delivery bin into the desired storage chute. Independent counting means are attached both to the platform driving means and the delivery bin driving means as an indicator of the position of the delivery bin within the superposed vertical and horizontal planes. As the desired number of revolutions of vertical and horizontal drive is reached, the driving systems are closed, stopping the delivery bin at the desired vertical and horizontal increment. By employing one delivery bin system on one end of a storage area of superposed shelves and another similar recovery bin system on the other end of the storage area, a total delivery to and from the area is accomplished.

BRIEF DESCRIPTION OF THE DRAWINGS

FIG. 3 is a schematic showing the transverse chain drive for the delivery bin;

FIG. 4 is a schematic view showing the chain drive for vertical movement of the platform throughout the vertical plane;

FIG. 5 is a fragmentary top plan with a portion removed so as to show the positioning of the transverse drive mechanism with respect to the platform;

FIG. 6 is a fragmentary side elevation of the platform, delivery bin 186 being shown in phantom;

FIG. 9 is a perspective view showing the elevator system positioned adjacent a tote bin storage rack comprised of superposed shelves, having individual, inclined chutes with optional idler rollers (not illustrated).

DESCRIPTION OF THE PREFERRED EMBODIMENTS

Figure 1:
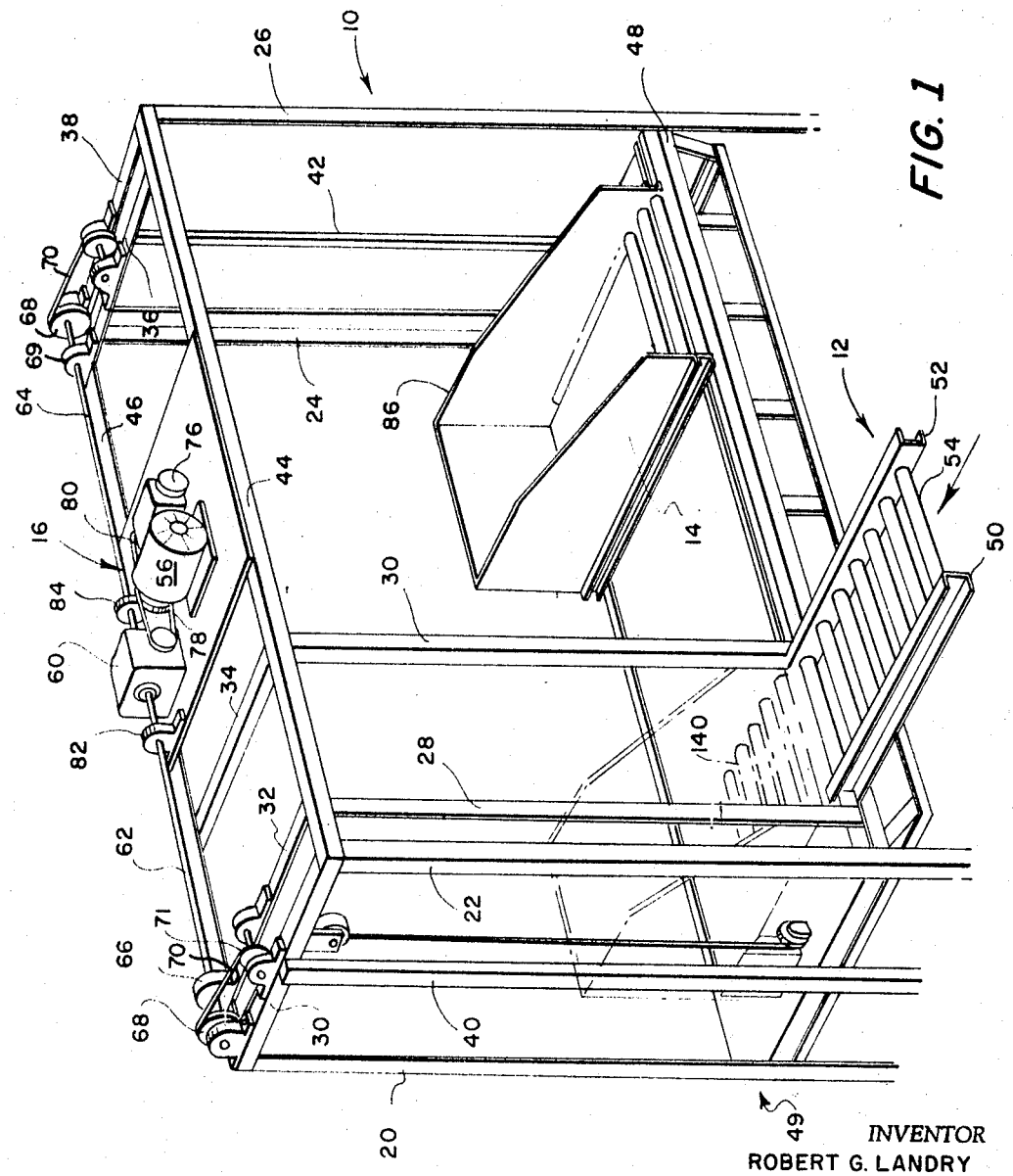
FIG. 1 is a perspective view of the system, showing the delivery bin in two attitudes of transverse movement.

In FIG. 1 the delivery bin system is illustrated as generally comprising upstanding frame 10, adjacently positioned feeding conveyor 12, delivery bin 14 and vertical axis drive mechanism 16 lifting the delivery bin platform through the vertical plane.

In FIG. 1 frame 10 is comprised of vertical channel or like elements 20, 22, 24, and 26, vertical intermediate support struts 28 and 30, top horizontal intermediate support struts 30, 32, 34, 36, and 38. At either end of this frame vertical guide tracks 40 and 42 may be secured. Top front horizontal strut 44 and top back horizontal strut 46 and bottom front horizontal struts 48 and 49 complete the frame assembly.

Delivery chute 12 may consist of channels 50 and 52 supporting a plurality of rotatable drive rollers 54, whereby a pallet or totebox is delivered into the delivery bin 86 which has a floor of rotatively driven rollers 140.

Figure 2:
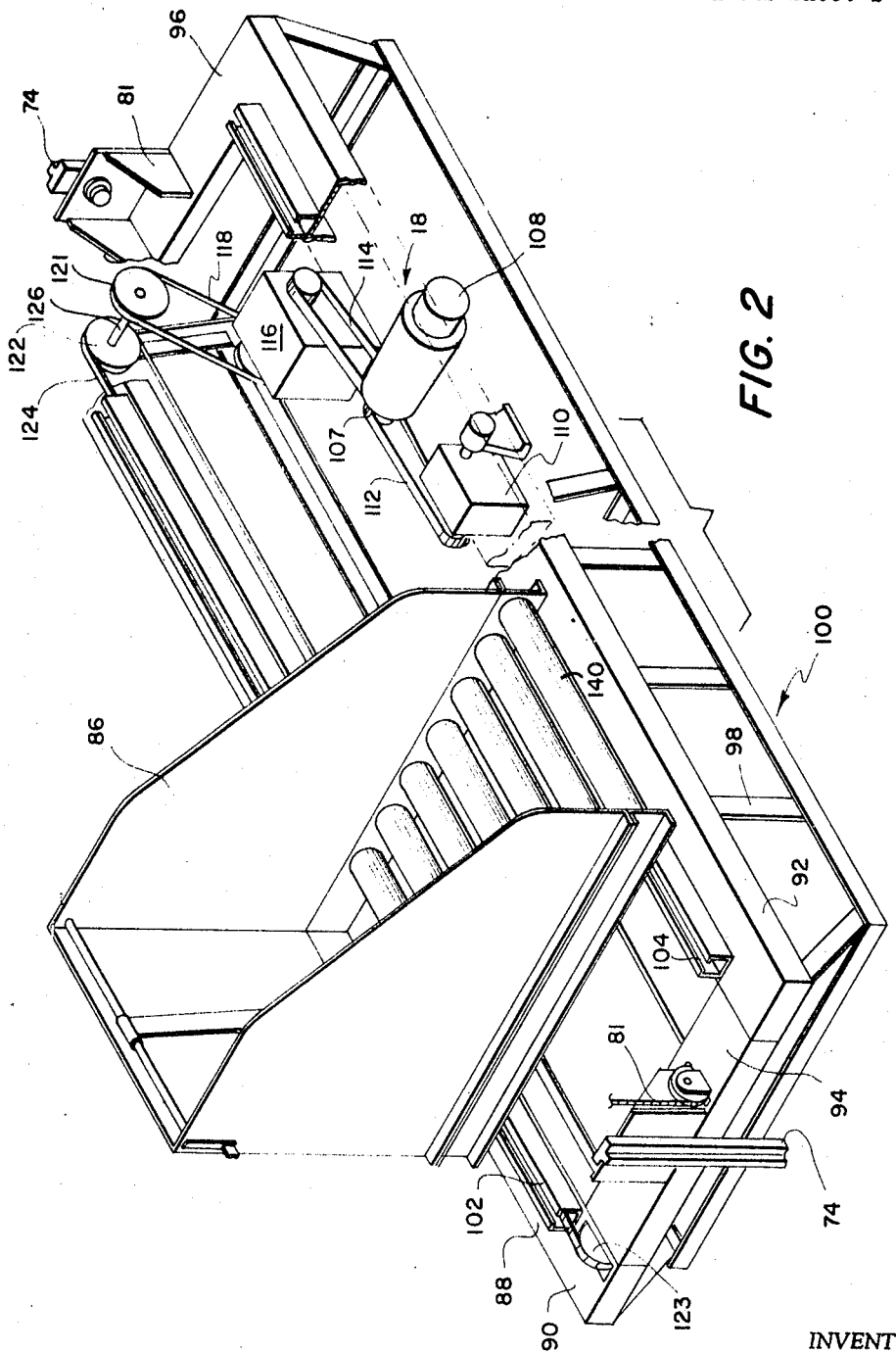
FIG. 2 is an enlarged fragmentary perspective showing the transverse guide means 102 and 104 supported upon the platform for guidance of the delivery bin.

The vertical axis drive mechanism 16 includes drive motor 56 which may be coupled by belt 78 to motor gear reduction box 60 and also by belt 80 to shaft-counting mechanism 76. Drive shafts 62 and 64 extend from either side of gear reduction box 60 and at either end are mounted in like bearing blocks 82, 84, and 66, 69. Sprockets 68 mounted at either end of shafts 62 and 64 engage drive chain 70 which extends about sprockets 71 and is secured in transverse channels 96 at either side of platform 88, defining the periphery of the vertical plane in which the platform is driven. A track engaging runner 74 is pivoted at either end of the platform in corresponding brackets 81 as illustrated in FIG. 2. As illustrated in FIG. 5, a tilt spring 106 may be secured intermediate channel 90 and track engaging guide 74 at its other end so as to tilt the platform 88, notwithstanding movement of the auto bin transversely, thereof. Tilt spring 106 tilts delivery bin 86 so that rollers 140 are parallel to the inclined slope of the storage rack chutes 170, illustrated in FIG. 9. Auto delivery bin, including open housing area 86, is slidably mounted on platform 88, which is comprised of channels 90, 92, 94 and 96. Vertically depending struts 98 support a bottom channel frame 100. Horizontal channels 102, 104 are mounted as tracks upon the top of platform 88 so as to engage the vertically depending track engaging guides 134, 136 extending from the auto bin bottom plate 138, as illustrated in FIGS. 7 and 8.

As illustrated in FIGS. 2 and 3, the drive mechanism for the auto bin comprises drive motor 108 having shaft 107 coupled by belt means 112 to shaft counter 110 and coupled by belt 114 to reduction gear box 116 in turn coupled by chain 118 to sprocket 121 and shaft 126 extending from drive sprocket 122 which engages chain 124. As the motor 108 is driven, chain 124 is rotated about sprockets 122 and 123, driving the delivery bin from side to side or transversely across the platform.

Figure 7:
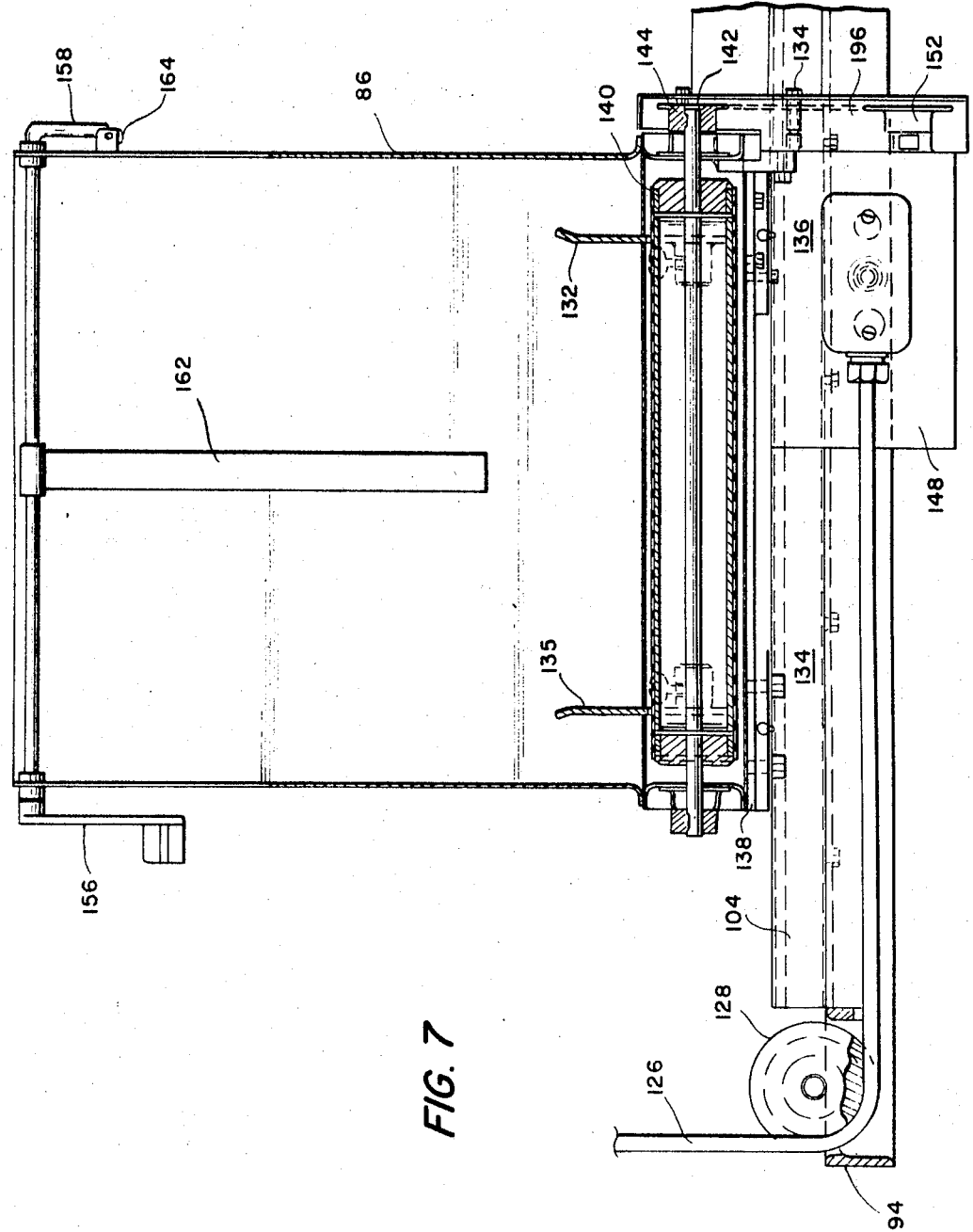
FIG. 7 is an enlarged fragmentary front elevation showing the delivery bin slidably positioned upon the platform.

Auto bin 86, includes a plurality of motor driven rollers 140 mounted upon shafts 142 extending through its sides and having at one end sprockets 144, as illustrated in FIG. 7. Drive motor 148, as illustrated in FIG. 8 having drive sprocket 152 is connected to bottom roller sprockets 144 by means of chain 146 which is urged against the sprockets by idler rollers 150 and 154. The drive motor 148 is powered by electric cord 126 extending rotatably about pulley 128. Drive motor 148 is actuated by electric control means (not illustrated) so as to drive the rollers in a clockwise direction in order to advance a pallet or material into delivery bin 86. Then, as switch arm 162 is contacted by the advancing pallet, the driving is stopped. As the delivery bin is advanced vertically to the proper plane and laterally to the desired chute in the storage rack by means of vertical driving mechanisms 16 and transverse driving mechanism 18, rollers 140 are rotated in counterclockwise direction so as to eject a pallet or material into the desired chute. As illustrated in FIG. 7, one or more laterally adjustable baffles may be supported within bin 86, so as to dimension the bin interior complementally with the pallet or material being received.

Figure 8:
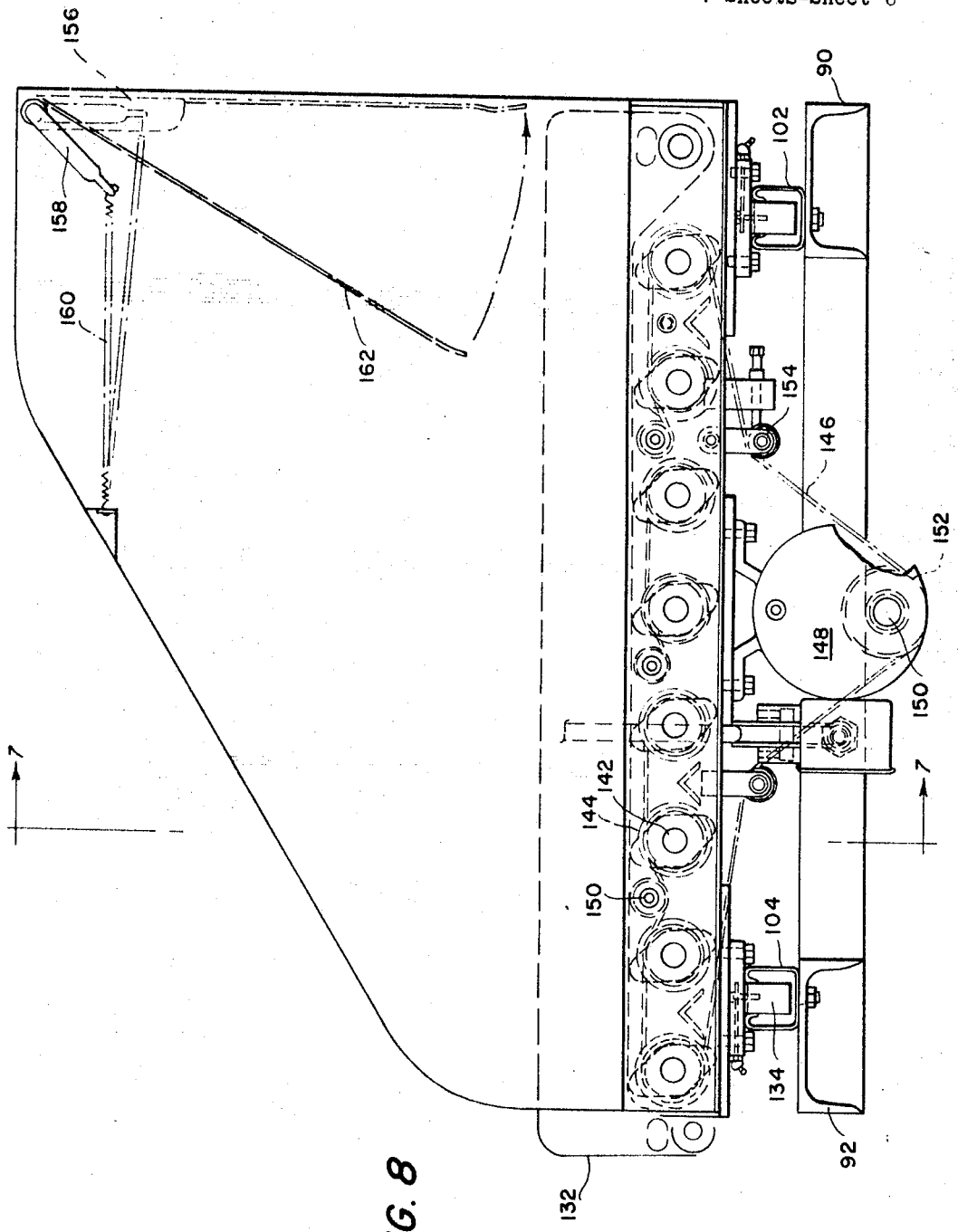
FIG. 8 is a side elevation of the delivery bin, showing the drive rollers positioned in the floor of the delivery bin.

As illustrated in FIG. 8, switch arm 156 is pivoted in the auto bin housing top so that its switch arm plate 162 extends pivotably into the delivery box area. A tension spring 160 engages the switch arm shaft 158 so as to hold the device in open position. As pallet or material is advanced by the rotating rollers 140 into the box the switch arm plate 162 is closed against the housing, cutting off the driving mechanism and starting the cycle. The cycle cannot be started, if switch arm 156 is not lined up with its corresponding home switch in load position.

As will be apparent, precise control of the vertical and transverse positioning of the delivery bin within the superposed planes of operation is readily achieved by counting the revolutions of the two driving system shafts by any one of a number of conventional selectors which are well known in the art. Additional conventional controls of the system may consist in employing photo cells together with indicators on the tote bins, signaling the driving systems to advance the delivery bin to the desired storage chute. Also, varied mechanisms may be employed in the storage area to indicate material stored and thus enable a like elevator recovery system to receive by gravity feed material desired to be withdrawn from the storage area, thence deliver the tote box to a desired work station. Also, of course, various conventional hoist mechanisms, other than those illustrated, may be employed to hoist vertically the platform within the frame and to shift the bin laterally upon the platform. Many such expedients may be implemented without departing from the spirit and scope of invention.

What is claimed is:
1. A material handling apparatus comprising:
(A) a storage frame with a plurality of vertically and horizontally spaced storage chutes;
(B) an upstanding open type frame positioned immediately adjacent said storage frame, the longitudinal dimension of said upstanding frame being greater than the storage frame;
(C) a rectangular platform mounted in said upstanding frame for vertical movement relative thereto;
(D) longitudinally disposed laterally spaced guide means mounted on said platform;
(E) a delivery bin movably mounted on said platform means, said bin including means engageable with said guide means for guiding said bin, said delivery bin further including vertically standing sides, a back, an open front, and a floor defined by a plurality of rollers;
(F) baffle means mounted within said bin for guiding articles to and from said delivery bin;
(G) means for laterally moving said baffle means in said bin;
(H) hoist means mounted on said upstanding frame and operatively connected to said platform to position said delivery bin thereon to a vertical level corresponding to selected one of said storage chutes;
(I) delivery bin driving means mounted on said platform and operative to position said bin at the horizontal location corresponding to a selected one of said storage chutes;
(J) independent control means responsive to the operation of said hoist means and delivery bin driving means, respectively, to position said platform and delivery bin at the selected storage chute;
(K) reversible drive means for driving said rollers so as to receive articles into said delivery bin and to eject articles from said delivery bin into said storage chute;
(L) means mounted on said delivery bin to control said reversible drive means; and

(M) means located within a projected plane of the longitudinal dimensions of said upright frame and parallel to at least a portion of one side of the storage frame for feeding articles to said delivery bin.

2. A delivery bin system as in claim 1, said platform being guided in said frame by vertically extending track means and being driven in said frame by a chain drive rotatably supported at either end of said frame.

3. A delivery bin system as in claim 2, said platform having a horizontal guide track, engageable by said delivery bin.

4. A delivery bin system as in claim 3, said vertical and horizontal planes being defined by vertical drive chains extending parallel to said track means and engageable with said platform at either end and a horizontal drive chain extending parallel with said horizontal guide track and engageable with said delivery bin.

5. A delivery bin system as in claim 4, including limit switches connected to said delivery bin drive roller actuating means supported in the floor of said bin, said limit switches being tripped upon positioning of said delivery bin adjacent said feeding means and positioning of said delivery bin adjacent the desired individual storage chute.

6. A delivery bin system as in claim 5, including means mounting said delivery bin drive rollers in co-planar relationship with said storage chutes.

References Cited

UNITED STATES PATENTS

| | | |
|---|---|---|
| 434,582 | 8/1890 | Corning. |
| 1,949,964 | 3/1934 | Keller et al. _____ 214—16.4 X |
| 2,705,570 | 4/1955 | Maissian. |
| 2,899,086 | 8/1959 | De Saint-André. |
| 3,297,379 | 1/1967 | Artaud et al. |

FOREIGN PATENTS

| | | |
|---|---|---|
| 231,910 | 6/1959 | Australia. |

GERALD M. FORLENZA, Primary Examiner

RAYMOND B. JOHNSON, Assistant Examiner

U.S. Cl. X.R.

214—730